US012729351B2

(12) United States Patent
Wu

(10) Patent No.: US 12,729,351 B2
(45) Date of Patent: Sep. 8, 2026

(54) CLEANSING BAR AND COMPOSITION THEREOF

(71) Applicant: Conopco, Inc., Englewood Cliffs, NJ (US)

(72) Inventor: Guohui Wu, Woodbridge, CT (US)

(73) Assignee: Conopco Inc., Hoboken, NJ (US)

( * ) Notice: Subject to any disclaimer, the term of this patent is extended or adjusted under 35 U.S.C. 154(b) by 0 days.

(21) Appl. No.: 18/701,964

(22) PCT Filed: Oct. 25, 2022

(86) PCT No.: PCT/EP2022/079707

§ 371 (c)(1),
(2) Date: Apr. 17, 2024

(87) PCT Pub. No.: WO2023/072898

PCT Pub. Date: May 4, 2023

(65) Prior Publication Data

US 2024/0409850 A1 Dec. 12, 2024

(30) Foreign Application Priority Data

Nov. 1, 2021 (EP) .................................... 21205768

(51) Int. Cl.

| | |
|---|---|
| ***C11D 3/00*** | (2006.01) |
| ***C11D 3/12*** | (2006.01) |
| ***C11D 3/20*** | (2006.01) |
| ***C11D 3/22*** | (2006.01) |
| ***C11D 10/04*** | (2006.01) |
| ***C11D 11/00*** | (2006.01) |
| ***C11D 17/00*** | (2006.01) |
| *C11D 1/14* | (2006.01) |
| *C11D 1/28* | (2006.01) |
| *C11D 1/90* | (2006.01) |
| *C11D 1/94* | (2006.01) |
| *C11D 9/02* | (2006.01) |

(52) U.S. Cl.

CPC ............ *C11D 10/042* (2013.01); *C11D 3/128* (2013.01); *C11D 3/2086* (2013.01); *C11D 3/222* (2013.01); *C11D 11/0082* (2013.01); *C11D 17/0065* (2013.01); *C11D 1/146* (2013.01); *C11D 1/28* (2013.01); *C11D 1/90* (2013.01); *C11D 1/94* (2013.01); *C11D 9/02* (2013.01)

(58) Field of Classification Search

None

See application file for complete search history.

(56) References Cited

U.S. PATENT DOCUMENTS

| | | | |
|---|---|---|---|
| 5,009,814 | A | 4/1991 | Kelkenberg et al. |
| 5,211,870 | A | 5/1993 | Gilbert et al. |
| 5,225,098 | A | 7/1993 | Kacher et al. |
| 5,227,086 | A | 7/1993 | Kacher et al. |
| 5,262,079 | A | 11/1993 | Kacher et al. |
| 5,340,492 | A | 8/1994 | Kacher et al. |
| 5,389,279 | A | 2/1995 | Au et al. |
| 5,393,466 | A | 2/1995 | Ilardi et al. |
| 5,607,909 | A | 3/1997 | Kefauver et al. |
| 5,712,235 | A | 1/1998 | Nieendick et al. |
| 6,849,585 | B1 | 2/2005 | Farrell et al. |
| 2001/0046949 | A1 | 11/2001 | Agrawal et al. |
| 2002/0035048 | A1 | 3/2002 | Schultz et al. |
| 2002/0037818 | A1 | 3/2002 | Schultz et al. |
| 2002/0039978 | A1 | 4/2002 | Schultz et al. |
| 2002/0042351 | A1 | 4/2002 | Schultz et al. |
| 2009/0253601 | A1 | 10/2009 | Tan et al. |
| 2014/0378363 | A1 | 12/2014 | Thiessies et al. |
| 2016/0000669 | A1 | 1/2016 | Hinman et al. |

FOREIGN PATENT DOCUMENTS

| | | | |
|---|---|---|---|
| CA | 3167306 | 8/2021 | |
| EP | 0556957 | 8/1993 | |
| EP | 0752846 | 8/2001 | |
| IN | 187129 | 2/2002 | |
| PH | 26058 | 1/1992 | |
| WO | WO0042159 | 7/2000 | |
| WO | WO-0246346 A1 * | 6/2002 | ............ C11D 13/00 |
| WO | WO06094586 | 9/2006 | |

(Continued)

OTHER PUBLICATIONS

Search Report and Written Opinion in PCTEP2022079707; Feb. 27, 2023; World Intellectual Property Org. (WIPO).

Search Report and Written Opinion in EP21205768; May 4, 2022; European Patent Office (EPO).

Hartman et al.; Understanding the Dissolution of Zeolites; Langmuir; Apr. 2007; p. 5477-5484; vol. 23.

(Continued)

*Primary Examiner* — Necholus Ogden, Jr.

(74) *Attorney, Agent, or Firm* — Krista J. Aiello

(57) ABSTRACT

A cleansing bar, comprising: 5 to 50% by weight soap and free fatty acid, based on the total weight of the cleansing bar, comprising 30 to 50% by weight free fatty acid based on the total weight of the cleansing bar and 0 to 16% by weight soap based on the total weight of the cleansing bar; wherein the weight ratio of free fatty acid:soap is greater than 1:1; 10 to 25% by weight non-soap synthetic surfactants, based on the total weight of the cleansing bar; 9 to 50% by weight zeolite, based on the total weight of the cleansing bar; and 10 to 30% by weight water, based on the total weight of the cleansing bar; wherein a pH of the cleansing bar measured from an 8% by weight bar slurry is 4.5 to 10. The bars are produced via a high-speed extrusion process without negatives (e.g., free of grittiness, cracking, etc.) while retaining good user properties (e.g., lather).

20 Claims, No Drawings

(56) References Cited

FOREIGN PATENT DOCUMENTS

| | | |
|---|---|---|
| WO | WO2010089269 | 8/2010 |
| WO | WO2020169409 | 8/2020 |

OTHER PUBLICATIONS

Munthali et al.; Proton Adsorption Selectivity of Zeolites in Aqueous Media: Effect of Si/Al Ratio of Zeolites; Molecules; Dec. 2014; p. 20468-20481; vol. 19.

* cited by examiner

CLEANSING BAR AND COMPOSITION THEREOF

CROSS REFERENCE TO RELATED APPLICATIONS

The present application is a U.S. National Phase Application under 35 U.S.C. § 371 of International Application No. PCT/EP2022/079707, filed on Oct. 25, 2022, which claims priority to European Patent Application No. 21205768.1, filed on Nov. 1, 2021, the contents of which are incorporated herein in their entireties.

FIELD OF THE INVENTION

Disclosed herein is a cleansing bar. The cleansing bar comprises a composition that includes soap and free fatty acid, zeolite, and water.

BACKGROUND OF THE INVENTION

There is always a need to provide skin cleansing formulations having desirable cleansing efficacy without being harsh, being mild to the skin, and having the ability to deliver benefit agents such as moisturizers, antibacterial actives, etc. Neutral pH bars with low levels of soap and free fatty acid (FFA), as well as low levels of synthetic surfactants while retaining good in-use properties are desired, as they provide the benefits such as skin mildness and enhanced availability of fragrance and actives, etc. pH of the cleansing formulation is one of the key attributes associated with skin mildness as it directly impacts the stability and delivery of benefit agents, and maintenance of natural proteins and lipids of skin.

Cleansing bars are generally prepared through one of two routes. One is known as the cast bar route while the other is known as the milled and plodded route (also known as the extrusion route). The cast bar route has inherently been very amenable in preparing low total fatty matter (TFM) cleansing bars. TFM is a common way of defining the quality of the cleansing composition. TFM is defined as the total amount of fatty matter, mostly fatty acids, that can be separated from a sample of the cleansing composition after splitting with a mineral acid, usually hydrochloric acid. In cast cleansing bars, a soap mixture is mixed with polyhydric alcohols, poured in casts, allowed to cool, and then the cleansing bars are removed from the casts. The cast bar route enables bar production at relatively lower throughput rates.

In the milled and plodded route, the cleansing composition is prepared with a high-water content and then spray dried to reduce the moisture content and to cool the soap after which other ingredients are added. Then the soap is extruded through a plodder and optionally cut and stamped to prepare the final cleansing bar. The milled and plodded bars generally have a high TFM in an amount of 60 to 80% by weight.

Milled and plodded cleansing bars are also known as extruded cleansing bars. They are composed of very many different types of soaps.

In addition to the 60 to 80% by weight TFM, cleansing bars presently prepared through the extruded route for personal wash contain about 14 to about 22% by weight water. There is a need for developing sustainable technologies where one approach is to develop soaps with lower TFM content and by increasing the water content with no compromise on the cleaning efficacy. These technologies include approaches to structure soap bars, like inclusion of aluminum phosphate or in-situ generation of calcium silicate. Such technologies are useful for preparing bars for laundering applications, but such materials are not very skin friendly and so are not appropriate for personal washing. If one simply substitutes the TFM with a higher amount of water, it causes problems during extrusion of the soap mass and further the extruded bars are sticky and cannot be stamped easily. Other approaches include inclusion of natural aluminosilicate clays like bentonite or kaolinite, but they are found to not be very efficient in structuring the bars at low amounts.

As such, there is continually a need for cleansing bars with lower TFM and higher water content without a corresponding loss in desired cleansing bar properties.

U.S. Pat. No. 6,849,585 to Farrell et al. discloses bars having low levels of synthetic surfactant (less than 25% by weight) and a minimum of 65% by weight of a combination of fatty acid soap and FFA. The claims specify the bars comprises less than 15% by weight water; though from the examples, it is clear the bars comprise a maximum of 9% by weight water. Given the fatty acid soap and FFA used as the structurant in Farrell et al., it may well be that many of the bars will not have sufficient hardness at a water content of greater than 10% by weight.

U.S. Pat. No. 5,607,909 to Kefauver et al. discloses a personal cleansing freezer bar comprising 30% by weight to 85% by weight tailored fatty acid soap, 3% by weight to 30% by weight synthetic surfactant, and 15% by weight to 35% by weight water, where the tailored fatty acid soap is a mixture of 65% by weight to 95% by weight sodium soap and 5% by weight to 35% by weight magnesium soap. The pH of bars of Kefauver is not specified in either the specification or the claims. Given their lathering soap is selected from the group of C8, C10, C12, C18:1, and C18:2 fatty acid soaps, the pH may well be above 8.5. Otherwise, at a pH below 8.5 the bars disclosed therein would contain predominantly free fatty acid which has poor lather.

International Patent Publication No. WO 2020/169409 to Agarkhed et al. discloses an extruded bar comprising 40% by weight to 75% by weight soap, 3% by weight to 20% by weight zeolite, and 22% by weight to 35% by weight water. The pH of the bars disclosed therein is preferably 9 to 11. Since the bars of Agarkhed et al. may optionally comprise 2 to 15% by weight free fatty acid, the level of free fatty acid is less than the level of soap.

U.S. Pat. No. 5,211,870 to Gilbert et al. discloses malodor-free cleansing bars comprising 2% to 30% by weight free fatty acid, 0 to 15% by weight soap, 4 to 32% saturated long chain (C15-C22) synthetic surfactants, and 20 to 70% by weight mild lathering surfactants, where the synthetic surfactants are more than soap.

It is continually desired to produce cleansing bars with increased moisture content while simultaneously reducing soap/FFA levels, and non-soap synthetic surfactant levels, while retaining excellent in-use properties, such as lather. For example, it is desired to produce mild cleansing bars having a pH close to neutral with increased moisture level content while simultaneously reducing soap/FFA levels, and non-soap synthetic surfactant levels, while retaining excellent in-use properties, such as lather.

SUMMARY OF THE INVENTION

Disclosed in various aspects are cleansing bars and compositions thereof.

A cleansing bar comprises: a composition comprising 5 to 50% by weight soap and free fatty acid, based on the total weight of the cleansing bar, comprising 30 to 50% by weight free fatty acid based on the total weight of the cleansing bar and 0 to 16% by weight soap based on the total weight of the cleansing bar; wherein the weight ratio of free fatty acid: soap is greater than 1:1; less than 10 to 25% by weight non-soap synthetic surfactants, based on the total weight of the cleansing bar; 93 to 50% by weight zeolite, based on the total weight of the cleansing bar; and 10 to 30% by weight water, based on the total weight of the cleansing bar; wherein a pH of the cleansing bar measured from an 8% by weight bar slurry is 4.5 to 10. The measurement occurs at 25° C.

These and other features and characteristics are more particularly described below.

DETAILED DESCRIPTION OF THE INVENTION

Disclosed herein is a cleansing bar that comprises low levels of a combination of fatty acid soap and FFA (e.g., less than or equal to 50% by weight), low levels of non-soap synthetic surfactants (e.g., less than 25% by weight); 9 to 50% by weight zeolite; and 10 to 30% by weight water. The level of FFA is preferably greater than the level of soap (the ratio of FFA to soap greater than 1:1) so the pH of the cleansing bar is close to neutral (for example, 5 to 8.5). The bars are produced with a high-speed extrusion process while retaining good user properties (e.g., lather). By high-speed extrusion process means bars can be extruded, cut, and stamped at a rate of 200 or more bars per minute without negatives such as grittiness, cracking, etc.

The present cleansing bars comprise a much lower level of a combination of soap and FFA (i.e., less than or equal to 50%), and high water content (at least 12%, preferably above 15%). Further, the cleansing bars have a hardness of at least 3.0 Kg at 45° C. as measured by a TA.XT texture analyzer. The present cleansing bars require no magnesium soap. Further, the bars in the subject application have a pH of 4.5 to 10, preferably 5 to 9, more preferably, 5 to 8.5, which is close to skin's natural pH.

It was surprising and unexpected to discover that with reduced synthetic surfactants and a low level of a combination of fatty acid soap and free fatty acid, the bars retained very good in-use properties, such as lather. Prior to this work, there have been no bars where zeolite was applied in neutral pH bars to increase moisture content (above 10% by weight, preferably above 12% by weight), at the same time to reduce the soap and FFA level (equal to or below 50% by weight), and to reduce non-soap synthetic level (below 25% by weight, preferably below 21% by weight).

Further disclosed herein is a process to prepare neutral pH bars with a level of zeolite greater than 3% by weight. Processing zeolite in bar making is challenging, as the process is sensitive to zeolite addition. Improper processing typically leads to very gritty bars. With the process disclosed herein, it was surprising to discover bars that could be made free of grit and cracking while containing a level of zeolite of greater than 3% by weight. The bars are preferably prepared by a high-speed extrusion process.

Disclosed herein is a cleansing bar and a composition thereof. The cleansing bar comprises a composition that contains soap and free fatty acid, zeolite, and water. It was unexpectedly found that non-gritty cleansing bars could be produced even with the inclusion of zeolite and higher water content. For example, the cleansing bar composition can contain less than or equal to 50% by weight soap and free fatty acid, less than 25% by weight synthetic surfactants, 3 to 50% by weight zeolite, and 10 to 30% by weight water, including any and all ranges subsumed therein and wherein % by weight refers to the % weight in the overall cleansing bar composition. For example, the cleansing bar composition can be present in an amount of 5 to 50% by weight The level of free fatty acid is preferably greater than the level of soap (the ratio of free fatty acid to soap is greater than 1:1). For example, in the combination of soap and free fatty acid, the free fatty acid can be present in an amount of 67%, 70%, 75%, 80%, 85%, 90%, 95%, or 100% by weight, while the soap can be present in an amount of 33%, 30%, 25%, 20%, 15%, 10%, 5%, or 0% by weight. In these amounts at a level of less than or equal to 50% by weight in the cleansing bar composition, the free fatty acid can be present in an amount in the overall cleansing bar composition of 33.5, 35, 37, 40, 42.5, 45, 47.5, or 50% by weight and the soap can be present in an amount of 16, 15, 12.5, 10, 7.5, 5, 2.5, or 0% by weight. For example, the free fatty acid can be present in an amount of 30 to 50% by weight, for example, 30 to 45% by weight, for example, 30.5 to 40% by weight, for example, for example, 32 to 40% by weight, for example, 30.5 to 32.8% by weight, wherein % by weight refers to the % weight in the overall cleansing bar composition. The soap can be present in an amount of 0 to 16% by weight, for example, 0 to 12% by weight, for example, 2 to 10% by weight, wherein % by weight refers to the % weight in the overall cleansing bar composition. A neutral pH (e.g., pH 4 to 10, pH 5 to 9, pH 5 to 8.5) cleansing bar can be obtained with the formulations disclosed herein.

Cleansing bar as described herein refers to a cleansing bar composition comprising a combination of soap and FFA which is in the form of a shaped solid. The cleansing bar can be particularly useful for personal cleansing. The cleansing bar is a wash off product that generally contains an amount of surfactants that is used for cleansing the desired topical surface, for example, the body, hair, scalp, and/or the face. The cleansing bar is applied on the topical surface and left thereon for only a few seconds or minutes and thereafter washed off with copious amounts of water.

Soap as referred to herein means salt of fatty acid. The soap can be a soap of C8 to C24 fatty acids. The basic structure of soap includes a long hydrophobic (water-fearing) hydrocarbon "tail" and a hydrophilic (water-loving) anionic "head" with the following structure:

$$CH_3(CH_2)_nCOO—$$

The length of the hydrocarbon chain ("n") varies with the type of fat or oil. The anionic charge on the carboxylate (COO—) head is usually balanced by either a positively charged potassium ($K^+$) or sodium ($Na^+$) cation. The cleansing bars disclosed herein generally comprise low molecular weight soap (C8 to C24 soap), which is generally water soluble. For example, the soap can comprise C8 to C18 soap, for example, C10 to C14 soap, for example, C16 to C18 soap. The soap can be present in an amount of less than 20% by weight of the cleansing bar composition. For example, the soap can be present in an amount of 0, 2.5, 5, 7.5, 10, 12.5, 15, or 16% by weight, including any and all ranges subsumed therein and wherein % by weight refers to the weight percent present in the overall cleansing bar composition. The soap can be present in an amount of 0 to 16% by weight, for example, 0 to 12% by weight, for example, 2 to 10% by weight, wherein % by weight refers to the % weight in the overall cleansing bar composition. Unsaturated fatty acid soaps can be included in the total soap content of the cleansing bar composition. Unsaturated soaps can be oleic acid soaps. When present, the unsaturated soaps can be present in an amount of 0% to 15% by weight Preferably, saturated fatty acid soaps and free fatty acids should be predominant over unsaturated ones, and the ratio between saturated and unsaturated soap/free fatty acid should be at least greater than 4.3:1, more preferably greater than 5:1.

Water insoluble structurants can be used but are also required to have a melting point of 40 to 100° C., more preferably at least 50° C., notably 50° C. to 90° C. Desirable materials which are particularly envisaged are fatty acids, particularly those having a carbon chain of 12 to 24 carbon atoms. Examples are lauric, myristic, palmitic, stearic, arachidonic, behenic acid, and mixtures thereof. Sources of these fatty acids are coconut, topped coconut, palm, palm kernel, babassu, and tallow fatty acids and partially or fully hardened fatty acids or distilled fatty acids. Other desirable water insoluble structurants include alkanols of 8 to 20 carbon atoms, particularly cetyl alcohol. These materials generally have a water solubility of less than 5 g/liter at 20° C.

The fatty acid can be selected from lauric acid, myristic acid, palmitic acid, stearic acid, behenic acid, oleic acid, linoleic acid, lanolic acid, isostearic acid, arachidonic acid, hydroxystearic acid, or a combination thereof. Preferably, the fatty acid is selected from stearic acid, palmitic acid, or a combination thereof.

Typical of the soap salts are alkali metal or alkanol ammonium salts of such fatty acids, although other metal salts thereof, e.g., magnesium salts, may also be employed. Sodium, potassium, magnesium, mono-, di- and tri-ethanol ammonium salts of such acids are among the desirable soaps for use herein.

The soap can be a neutralized fatty acid. The neutralized fatty acid can be selected from lauric acid, myristic acid, palmitic acid, stearic acid, behenic acid, oleic acid, linoleic acid, lanolic acid, isostearic acid, arachidonic acid, hydroxystearic acid, or a combination thereof. Preferably, the fatty acid is selected from stearic acid, palmitic acid, or a combination thereof.

In making soap, triglycerides in fat or oils are heated in the presence of a strong alkali base such as sodium hydroxide, producing three molecules of soap for every molecule of glycerol. This process is called saponification. The cation can be an alkali metal, an alkaline earth metal, or an ammonium ion. Preferably, the cation is an alkali metal. For example, the cation can be selected from sodium or potassium. Preferably, the cation is sodium. The soap can be saturated or unsaturated. Saturated soaps can be preferred over unsaturated soaps for stability purposes. The oils or fatty acids can be of vegetable or animal origin.

The fats or oils generally used to make soap bars can be selected from tallow, tallow stearins, palm oil, palm stearins, soya bean oil, fish oil, castor oil, rice bran oil, sunflower oil, coconut oil, babassu oil, and palm kernel oil. The fatty acids can be from coconut, rice bran, groundnut, tallow, palm, palm kernel, cotton seed or soyabean.

The fatty acid soaps can also be synthetically prepared (e.g., by the oxidation of petroleum or by the hydrogenation of carbon monoxide by the Fischer-Tropsch process). Resin acids, such as those present in tall oil, can also be used. Naphthenic acids can also be used.

Preferably, the soap comprises the salt of palmitic acid, stearic acid, or a combination thereof. The soap can comprise the salt of palmitic acid and stearic acid in a ratio of 1:1.

The cleansing bar composition comprises zeolite in an amount of less than or equal to 50% by weight, for example, 9 to 50% by weight, for example, 9 to 45% by weight, for example, 12 to 45% by weight, for example, 14 to 43% by weight of the composition, including any and all ranges subsumed therein. Zeolites are hydrated aluminosilicates. In an embodiment, the zeolite can be present in an amount of 9 to 15% by weight, based on the % by weight in the overall cleansing bar composition. Their structure consists in a three-dimensional framework of interlinked tetrahydra of $AlO_4$ and $SiO_4$ coordinated by oxygen atoms. Zeolites are solids with a relatively open, three-dimensional crystal structure built from the elements aluminum, oxygen, and silicon, with alkali or alkaline-earth metals (such as sodium, potassium, or magnesium) with water molecules trapped in the gaps between them. Zeolites form with many different crystalline structures, which have large open pores (sometimes referred to as cavities) in a very regular arrangement and roughly the same size as small molecules.

The structural formula of zeolite based on its crystal unit cell (assuming both the $SiO_2$ and $AlO_2$ as variables) can be represented by $$M_{a/n}(AlO_2)_a(SiO_2)_b \cdot wH_2O,$$

where M is the cation (e.g., sodium, potassium, or magnesium), w is the number of water molecules per unit cell, and a and b are total number of tetrahedra of Al and Si, respectively per unit cell; and n is valency of the metal ion. The ratio of b/a usually varies from 1 to 5.

For example, for Mordenite the chemical formula is $Na_8(AlO_2)_8(SiO_2)_{40}$, where a=8 and b=40; and b/a is 5.

For Zeolite 4A, the chemical formula is $Na_{96}(AlO_2)_{96}(SiO_2)_{96}$, where a=96 and b=96; and b/a is 1.

Some zeolites have a b/a value which varies from 10 to 100 or even higher e.g., for a ZSM-5 type of zeolite.

Preferred zeolites for use in the cleansing bar composition include Zeolite 4A, Zeolite 5A, Zeolite 13A or Zeolite 3A with the most preferred zeolite being Zeolite 4A.

The cleansing bar composition comprises water in an amount of less than or equal to 30% by weight, for example, 12 to 30% by weight, for example, 10 to 20% by weight of the cleansing bar composition including any and all ranges subsumed therein.

The cleansing bar composition comprises free fatty acid. The cleansing bar composition can comprise 30 to 50% by weight free fatty acid. For example, the cleansing bar composition can comprise 33.5, 35, 37.5, 40, 42.5, 45, 47.5, or 50% by weight free fatty acid based on the combination with soap present in the soap bar composition. For example, the free fatty acid can be present in an amount of 30 to 50% by weight, for example, 30 to 45% by weight, for example, 30.5 to 40% by weight, for example, for example, 32 to 40% by weight, for example, 30.5 to 32.8% by weight, wherein % by weight refers to the % weight in the overall cleansing bar composition. The level of free fatty acid is preferably greater than the level of soap (the ratio of free fatty acid to soap greater than 1:1). By free fatty acids is meant a carboxylic acid comprising a hydrocarbon chain and a terminal carboxyl group bonded to an H. Suitable fatty acids are C8 to C22 fatty acids. Preferred fatty acids are C12 to C18, preferably predominantly saturated, straight-chain fatty acids. However, some unsaturated fatty acids can also be employed. The ratio between saturated and unsaturated soap/free fatty acid should be at least greater than 4.3:1, more preferably greater than 5:1

The composition preferably comprises a polyhydric alcohol (also called polyol) or mixture of polyols. Polyol is a term used herein to designate a compound having multiple hydroxyl groups (at least two, preferably at least three) which is highly water soluble. Many types of polyols are available including: relatively low molecular weight short chain polyhydroxy compounds such as glycerol, propylene glycol, or a combination thereof; sugars such as sorbitol, manitol, sucrose, glucose, or a combination thereof; modified carbohydrates such as hydrolyzed starch, dextrin, maltodextrin, or a combination thereof; and polymeric synthetic polyols such as polyalkylene glycols, for example polyoxyethylene glycol (PEG), polyoxypropylene glycol (PPG), or a combination thereof. Especially preferred polyols are glycerol, sorbitol, or combinations thereof. A most preferred polyol is glycerol. The cleansing bar compositions can comprise 0 to 8% by wt., preferably 1 to 7.5% by wt. polyol, including any and all ranges subsumed therein.

The cleansing bar composition optionally comprises electrolyte and water. Electrolytes as described herein include compounds that substantially dissociate into ions in water. Electrolytes as disclosed herein do not include an ionic surfactant. Desirable electrolytes for inclusion in the cleansing bar making process are alkali metal salts. Preferred alkali metal salts include sodium sulfate, sodium chloride, sodium acetate, sodium citrate, potassium chloride, potassium sulfate, sodium carbonate, and other mono or di or tri salts of alkaline earth metals, more preferred electrolytes are sodium chloride, sodium sulfate, sodium citrate, potassium chloride, and an especially preferred electrolyte is sodium chloride, sodium sulphate, sodium citrate, or a combination thereof. For the avoidance of doubt, it is clarified that the electrolyte is a non-soap material. When present, the electrolyte is included in an amount of 0.1 to 6%, more preferably 0.5 to 6%, even more preferably 0.5 to 5%, furthermore preferably 0.5 to 3%, and most preferably 1 to 3% by weight of the overall cleansing bar composition. It is preferred that the electrolyte is included in the cleansing bar during the step of saponification to form the soap.

The composition may be made into a cleansing bar by a process that first involves saponification of the fat charge with alkali followed by extruding the mixture in a conventional plodder. The plodded mass may then be optionally cut to a desired size and stamped with a desirable indicia. A desirable feature of the cleansing bars is that, notwithstanding the high amount of water content of the cleansing bar, compositions thus prepared by extrusion are found to be easy to stamp with a desirable indicia.

The various optional ingredients that make up the final cleansing bar composition are as described below:

The total level of the adjuvant/filler materials used in the cleansing bar composition should be in an amount not higher than 50%, preferably 1 to 50%, more preferably 3 to 45% by weight of the cleansing bar composition.

Suitable starchy materials which may be used include natural starch (from corn, wheat, rice, potato, tapioca, and the like), pregelatinized starch, various physically and chemically modified starch, and combinations thereof. By the term natural starch is meant starch which has not been subjected to chemical or physical modification—also known as raw or native starch. The raw starch can be used directly or modified during the process of making the cleansing bar composition such that the starch becomes gelatinized, either partially or fully gelatinized.

The adjuvant/filler system may optionally include insoluble particles comprising one or a combination of materials. By insoluble particles is meant materials that are present in solid particulate form and suitable for personal washing. Preferably, there are mineral (e.g., inorganic) or organic particles.

The insoluble particles should not be perceived as scratchy or granular and thus should have a particle size less than or equal to 300 micrometers, more preferably less than or equal to 100 micrometers, and most preferably less than or equal to 50 micrometers.

Desirable inorganic particulate material includes talc and calcium carbonate. Talc is a magnesium silicate mineral material, with a sheet silicate structure and a composition of $Mg_3Si_4(OH)_{22}$ and may be available in the hydrated form. It has a plate-like morphology, and is essentially oleophilic/hydrophobic, i.e., it is wetted by oil rather than water.

Calcium carbonate or chalk exists in three crystal forms: calcite, aragonite and vaterite. The natural morphology of calcite is rhombohedral or cuboidal, acicular or dendritic for aragonite and spheroidal for vaterite.

Examples of other optional insoluble inorganic particulate materials include aluminates, silicates (e.g., sodium silicate, aluminum silicate, etc.), phosphates, insoluble sulfates, borates, and clays (e.g., kaolin, china clay), and their combinations.

Organic particulate materials include insoluble polysaccharides such as highly crosslinked or insolubilized starch (e.g., by reaction with a hydrophobe such as octyl succinate) and cellulose; synthetic polymers such as various polymer lattices and suspension polymers; insoluble soaps and mixtures thereof.

The cleansing bar compositions disclosed herein can include polymers. Polymers of the acrylate class are especially preferred. Preferred bars include 0.05 to 5% by weight acrylates, preferably 0.01 to 3% by weight acrylates. Examples of acrylate polymers include polymers and copolymers of acrylic acid crosslinked with polyallylsucrose as described in U.S. Pat. No. 2,798,053, which is herein incorporated by reference in its entirety. Other examples include polyacrylates, acrylate copolymers or alkali swellable emulsion acrylate copolymers, hydrophobically modified alkali swellable copolymers, and crosslinked homopolymers of acrylic acid. Examples of such commercially available polymers are: ACULYN®, CARBOPOL®, and CARBOPOL® Ultrez grade series.

Cleansing bar compositions preferably comprise 0.1 to 25% by wt., preferably 5 to 15 by wt. of these mineral or organic particles.

An opacifier may be optionally present in the personal care composition. When opacifiers are present, the cleansing bar is generally opaque. Examples of opacifiers include titanium dioxide, zinc oxide, and the like. A particularly preferred opacifier that can be employed when an opaque soap composition is desired is ethylene glycol mono- or di-stearate, for example in the form of a 20% solution in sodium lauryl ether sulphate. An alternative opacifying agent is zinc stearate.

The product can take the form of a water-clear, i.e., transparent soap, in which case it will not contain an opacifier.

The cleansing bars disclosed herein have a pH of 4.5 to 10, preferably, 5 to 9, more preferably, 5 to 8.5.

The cleansing bar disclosed herein comprises a surfactant. The surfactant can comprise an anionic surfactant, a nonionic surfactant, a zwitterionic surfactant, an amphoteric surfactant, a cationic surfactant, or a combination thereof. When present, the cleaning bar can contain the surfactant in an amount of less than or equal to 25 wt %, preferably less than or equal to 24 wt %, more preferably less than or equal to 21 wt %. For example, the cleansing bar can contain 10 to 25% by weight surfactant, for example, 10 to 20% by weight surfactant, based on the total weight of the cleansing bar.

The anionic surfactant used can include aliphatic sulfonates, such as a primary alkane (e.g., $C_8$-$C_{22}$) sulfonate, primary alkane (e.g., $C_8$-$C_{22}$) disulfonate, $C_8$-$C_{22}$ alkene sulfonate, $C_8$-$C_{22}$ hydroxyalkane sulfonate or alkyl glyceryl ether sulfonate (AGS); or aromatic sulfonates such as alkyl benzene sulfonate. The anionic surfactant may also be an alkyl sulfate (e.g., $C_{12}$-$C_{18}$ alkyl sulfate) or alkyl ether sulfate (including alkyl glyceryl ether sulfates). Among the alkyl ether sulfates are those having the formula:

$$RO(CH_2CH_2O)_nSO_3M$$

wherein R is an alkyl or alkenyl having 8 to 18 carbons, preferably 12 to 18 carbons, n has an average value of at least 1.0, preferably less than 5, and most preferably 1 to 4, and M is a solubilizing cation such as sodium, potassium, ammonium, or substituted ammonium.

The anionic surfactant may also be alkyl sulfosuccinates (including mono- and dialkyl, e.g., $C_6$-$C_{22}$ sulfosuccinates); alkyl and acyl taurates (often methyl taurates), alkyl and acyl sarcosinates, sulfoacetates, $C_8$-$C_{22}$ alkyl phosphates and phosphonates, alkyl phosphate esters and alkoxyl alkyl phosphate esters, acyl lactates, $C_8$-$C_{22}$ monoalkyl succinates and maleates, sulphoacetates, alkyl glucosides and acyl isethionates, and the like.

Sulfosuccinates may be monoalkyl sulfosuccinates having the formula:

$$R^1OC(O)CH_2CH(SO_3M)CO_2M;$$

and amide-MEA sulfosuccinates of the formula:

$$R^1CONHCH_2CH_2OC(O)CH_2CH(SO_3M)CO_2M$$

wherein $R^1$ ranges from $C_8$-$C_{22}$ alkyl.

Sarcosinates are generally indicated by the formula:

$R^2CON(CH_3)CH_2CO_2M$, wherein $R^2$ ranges from $C_8$-$C_{20}$ alkyl.

Taurates are generally identified by formula:

$$R^3CONR^4CH_2CH_2SO_3M$$

wherein $R^3$ is a $C_8$-$C_{20}$ alkyl, $R^4$ is a $C_1$-$C_4$ alkyl.

M is a solubilizing cation as previously described.

The cleansing composition disclosed herein may contain $C_8$-$C_{18}$ acyl isethionates. These esters are prepared by a reaction between alkali metal isethionate with mixed aliphatic fatty acids having from 6 to 18 carbon atoms and an iodine value of less than 20. At least 75% of the mixed fatty acids have from 12 to 18 carbon atoms and up to 25% have from 6 to 10 carbon atoms.

The acyl isethionate may be an alkoxylated isethionate such as is described in Ilardi et al., U.S. Pat. No. 5,393,466, entitled "Fatty Acid Esters of Polyalkoxylated isethonic acid; issued Feb. 28, 1995; hereby incorporated by reference. This compound has the general formula:

$$R^5C—O(O)—C(X)H—C(Y)H—(OCH_2—CH_2)_m—SO_3M$$

wherein $R^5$ is an alkyl group having 8 to 18 carbons, m is an integer from 1 to 4, X and Y are each independently hydrogen or an alkyl group having 1 to 4 carbons and M is a solubilizing cation as previously described.

In an aspect of the cleansing composition, the anionic surfactant used is 2-acrylamido-2-methylpropane sulfonic acid, ammonium lauryl sulfate, ammonium perfluorononanoate, potassium lauryl sulfate, sodium alkyl sulfate, sodium dodecyl sulfate, sodium laurate, sodium laureth sulfate, sodium lauroyl sarcosinate, sodium stearate, sodium sulfosuccinate esters, sodium lauroyl isethionate, or a combination thereof. Such anionic surfactants are commercially available from suppliers like Galaxy Surfactants, Clariant, Sino Lion, Stepan Company, and Innospec.

Amphoteric surfactants can be included in the cleansing bar disclosed herein. Amphoteric surfactants (which depending on pH can be zwitterionic) include sodium acyl amphoacetates, sodium acyl amphopropionates, disodium acyl amphodiacetates and disodium acyl amphodipropionates where the acyl (i.e., alkanoyl group) can comprise a $C_7$-$C_{18}$ alkyl portion. Illustrative examples of amphoteric surfactants include sodium lauroamphoacetate, sodium cocoamphoacetate, sodium lauroamphoacetate, or a combination thereof.

As to the zwitterionic surfactants employed in the present cleansing bar, such surfactants include at least one acid group. Such an acid group may be a carboxylic or a sulphonic acid group. They often include quaternary nitrogen, and therefore, can be quaternary amino acids. They should generally include an alkyl or alkenyl group of 7 to 18 carbon atoms and generally comply with an overall structural formula:

$$R^6\text{—}[C(O)—NH(CH_2)_q]_r\text{—}N^+(R^7)(R^8)—A—B$$

where $R^6$ is alkyl or alkenyl of 7 to 18 carbon atoms; $R^7$ and $R^8$ are each independently alkyl, hydroxyalkyl or carboxyalkyl of 1 to 3 carbon atoms; q is 2 to 4; r is 0 to 1; A is alkylene of 1 to 3 carbon atoms optionally substituted with hydroxyl, and B is $$—CO_2— \text{ or } —SO_3—.$$

Desirable zwitterionic surfactants for use in the cleansing bar disclosed herein and within the above general formula include simple betaines of formula:

$$R^6—N^+(R^7)(R^8)—CH_2CO_2^-$$

and amido betaines of formula:

$$R^6—CONH(CH_2)_t—N^+(R^7)(R^8)—CH_2CO_2^-$$

where t is 2 or 3.

In both formulae $R^6$, $R^7$ and $R^8$ are as defined previously. $R^6$ may, in particular, be a mixture of $C_{12}$ and $C_{14}$ alkyl groups derived from coconut oil so that at least half, preferably at least three quarters of the groups $R^6$ have 10 to 14 carbon atoms. $R^7$ and $R^8$ are preferably methyl.

A further possibility is that the zwitterionic surfactant is a sulphobetaine of formula:

$$R^6—N^+(R^7)(R^8)—(CH_2)_3SO_3^- \quad \text{or}$$
$$R^6—CONH(CH_2)_u—N^+(R^7)(R^8)—(CH_2)_3SO_3^-$$

where u is 2 or 3, or variants of these in which $$—(CH_2)_3SO_3^-$$

is replaced by $$—CH_2C(OH)(H)CH_2SO_3^-.$$

In these formulae, $R^6$, $R^7$ and $R^8$ are as previously defined.

Illustrative examples of the zwitterionic surfactants desirable for use include betaines such as lauryl betaine, betaine citrate, cocodimethyl carboxymethyl betaine, cocoamidopropyl betaine, coco alkyldimethyl betaine, and laurylamidopropyl betaine. An additional zwitterionic surfactant suitable for use includes cocoamidopropyl sultaine, for example, cocamidopropyl hydroxysultaine. Preferred zwitterionic surfactants include lauryl betaine, betaine citrate, sodium hydroxymethylglycinate, (carboxymethyl) dimethyl-3-[(1-oxododecyl) amino] propylammonium hydroxide, coco alkyldimethyl betaine, (carboxymethyl) dimethyloleylammonium hydroxide, cocoamidopropyl betaine, (carboxymethyl) dimethyloleylammonium hydroxide, cocoamidopropyl betaine, (carboxylatomethyl) dimethyl (octadecyl) ammonium, cocamidopropyl hydroxysultaine, or a combination thereof. Such surfactants are made commercially available from suppliers like Stepan Company, Solvay, Evonik and the like and it is within the scope of the cleansing bars disclosed herein to mixtures employ of the aforementioned surfactants.

Nonionic surfactants can be used in the cleansing bar. When used, nonionic surfactants are typically used at levels as low as 0.5, 1, 1.5 or 2% by weight and at levels as high as 6, 8, 10 or 12% by weight. The nonionic surfactants which may be used include in particular the reaction products of compounds having a hydrophobic group and a reactive hydrogen atom, for example aliphatic alcohols, acids, amides or alkylphenols with alkylene oxides, especially ethylene oxide either alone or with propylene oxide. Specific nonionic surfactant compounds are alkyl ($C_6$-$C_{22}$) phenols, ethylene oxide condensates, the condensation products of aliphatic ($C_8$-$C_{18}$) primary or secondary linear or branched alcohols with ethylene oxide, and products made by condensation of ethylene oxide with the reaction products of propylene oxide and ethylenediamine. Other nonionic surfactants include long chain tertiary amine oxides, long chain tertiary phosphine oxides, dialkyl sulphoxides, and the like.

In an aspect, nonionic surfactants can include fatty acid/alcohol ethoxylates having the following structures a) $HOCH_2(CH_2)_s(CH_2CH_2O)_c$ H or b) $HOOC(CH_2)_v(CH_2CH_2O)_d$ H; where s and v are each independently an integer up to 18; and c and d are each independently an integer from 1 or greater. In an aspect, s and v can be each independently 6 to 18; and c and d can be each independently 1 to 30. Other options for nonionic surfactants include those having the formula $$HOOC(CH_2)_i—CH{=}CH—(CH_2)_k(CH_2CH_2O)_z$$

H, where i, k are each independently 5 to 15; and z is 5 to 50. In another aspect, i and k are each independently 6 to 12; and z is 15 to 35.

The nonionic surfactant may also include a sugar amide, such as a polysaccharide amide. Specifically, the surfactant may be one of the lactobionamides described in U.S. Pat. No. 5,389,279 to Au et al., entitled "Compositions Comprising Nonionic Glycolipid Surfactants issued Feb. 14, 1995; which is hereby incorporated by reference or it may be one of the sugar amides described in U.S. Pat. No. 5,009,814 to Kelkenberg, titled "Use of N-Poly Hydroxyalkyl Fatty Acid Amides as Thickening Agents for Liquid Aqueous Surfactant Systems" issued Apr. 23, 1991; hereby incorporated into the subject application by reference.

Illustrative examples of nonionic surfactants that can be used in the cleansing bars disclosed herein include, but are not limited to, polyglycoside, cetyl alcohol, decyl glucoside, lauryl glucoside, octaethylene glycol monododecyl ether, n-octyl beta-d-thioglucopyranoside, octyl glucoside, oleyl alcohol, polysorbate, sorbitan, stearyl alcohol, or a combination thereof.

In an aspect, cationic surfactants can be used in the cleansing bar composition of the present application.

One class of cationic surfactants includes heterocyclic ammonium salts such as cetyl or stearyl pyridinium chloride, alkyl amidoethyl pyrrylinodium methyl sulfate, and lapyrium chloride.

Tetra alkyl ammonium salts are another useful class of cationic surfactants for use. Examples include cetyl or stearyl trimethyl ammonium chloride or bromide; hydrogenated palm or tallow trimethylammonium halides; behenyl trimethyl ammonium halides or methyl sulfates; decyl isononyl dimethyl ammonium halides; ditallow (or distearyl) dimethyl ammonium halides, and behenyl dimethyl ammonium chloride.

Still other types of cationic surfactants that may be used are the various ethoxylated quaternary amines and ester quats. Examples include PEG-5 stearyl ammonium lactate (e.g., Genamin KSL manufactured by Clariant), PEG-2 coco ammonium chloride, PEG-15 hydrogenated tallow ammonium chloride, PEG 15 stearyl ammonium chloride, dipalmitoyl ethyl methyl ammonium chloride, dipalmitoyl hydroxyethyl methyl sulfate, and stearyl amidopropyl dimethylamine lactate.

Still other useful cationic surfactants include quaternized hydrolysates of silk, wheat, and keratin proteins, and it is within the scope of the cleansing bar to use mixtures of the aforementioned cationic surfactants.

If used, cationic surfactants will make up no more than 1.0% by weight of the cleansing bar. When present, cationic surfactants typically make up from 0.01 to 0.7%, and more typically, from 0.1 to 0.5% by weight of the cleansing bar, including all ranges subsumed therein.

The cleansing bar can additionally include up to 30% by weight skin benefit agents. The term "skin benefit agent" is defined as a substance which softens or improves the elasticity, appearance, and youthfulness of the skin (stratum corneum) by either increasing its water content, adding, or replacing lipids and other skin nutrients, or both, and keeps it soft by retarding the decrease of its water content. Included among the suitable skin benefit agents are emollients, including, for example, hydrophobic emollients, hydrophilic emollients, or blends thereof.

Preferred benefit agents include moisturizers, emollients, sunscreens, and anti-aging compounds.

Desirably the optional skin benefit agents used in the cleansing bar disclosed herein include niacinamide (vitamin $B_3$), tocopherol (Vitamin E), aloe vera, alpha-hydroxy acids and esters, beta-hydroxy acids and esters, hydroxyethyl urea, polyhydroxy acids and esters, creatine, hydroquinone, t-butyl hydroquinone, mulberry, hyaluronic acid and salts thereof (including, but not limited to, Na+ and K+ salts of the same), extract, liquorice extract, resorcinol derivatives, or a combination thereof. For example, the skin benefit agent can be sodium hyaluronate. Such benefit agents, including sodium hyaluronate can be present in an amount of 0.0001 to 10%, for example, 0.001 to 6.5%, for example, 0.01 to 3.5%, and for example, 0.01% by weight, based on total weight of the cleansing bar composition including all values and ranges subsumed therein.

Further optional water-soluble skin benefit agents include acids, such as amino acids like arginine, valine or histidine. Other vitamins can be used such as vitamin $B_2$, picolinamide, panthenol (vitamin $B_5$), vitamin $B_6$, vitamin C, a combination thereof or the like. Derivatives (generally meaning something that has developed or been obtained from something else), and especially, water soluble derivatives of such vitamins can also be employed. For instance, vitamin C derivatives such as ascorbyl tetraisopalmitate, magnesium ascorbyl phosphate and ascorbyl glycoside may be used alone or in combination with each other. Niacinamide derivatives such as nicotinamide adenine dinucleotide (NADH) and nicotinamide adenine dinucleotide phosphate (NADPH) may be used alone or in combination with each other. Other skin benefit agents that can be used include 4-ethyl resorcinol, extracts like sage, aloe vera, green tea, sugar cane, citrus, grapeseed, thyme, chamomile, yarrow, cucumber, liquorice, rosemary extract, or a combination thereof. Electrolytes such as NaCl and/or KCl, $MgCl_2$ may also be used. The total amount of optional water-soluble benefit agents (including mixtures) when present in the bar disclosed herein can be 0.0001 to 10%, preferably, 0.001 to 6.5%, and most preferably, 0.01 to 3.5% by weight, based on total weight of the cleansing bar, including all values and ranges subsumed therein.

It is also within the scope of the cleansing bar to optionally include oil soluble benefit agents. Illustrative examples of the types of oil soluble benefit agents that can optionally be used in the cleansing bar disclosed herein include components like stearic acid, vitamins like vitamin A, D, E and K (and their oil soluble derivatives).

Other optional oil soluble benefit agents for use include resorcinols and resorcinol derivatives like 4-hexyl resorcinol, 4-phenylethyl resorcinol, 4-cyclopentyl resorcinol, 4-cyclohexyl resorcinol 4-isopropyl resorcinol or a combination thereof. Also, 5-substituted resorcinols like 4-cyclohexyl-5-methylbenzene-1,3-diol, 4-isopropyl-5-methylbenzene-1,3-diol, combination thereof or the like may be used. The 5-substituted resorcinols and their synthesis are described in commonly assigned U.S. Published Patent Application No. 2016/0000669A1.

Even other oil soluble benefit agents that can be used include omega-3 fatty acids, omega-6 fatty acids, climbazole, magnolol, honokiol, farnesol, ursolic acid, myristic acid, geranyl geraniol, oleyl betaine, cocoyl hydroxyethyl imidazoline, hexanoyl sphingosine, 12-hydroxystearic acid (12HSA), petroselinic acid, conjugated linoleic acid, stearic acid, palmitic acid, lauric acid, terpineol, thymol essential components, the dissolution auxiliary selected from limonene, pinene, camphene, cymene, citronellol, citronellal, geraniol, nerol, linalool, rhodinol, borneol, isoborneol, menthone, camphor, safrole, isosafrole, eugenol, isoeugenol, tea tree oil, *eucalyptus* oil, peppermint oil, neem oil, lemon grass oil, orange oil, bergamot oil, or a combination thereof.

Another optional oil soluble benefit agent that may be used is a retinoic acid precursor. The retinoic acid precursor can be retinol, retinal, retinyl ester, retinyl propionate, retinyl palmitate, retinyl acetate or a combination thereof. Retinyl propionate, retinyl palmitate and combinations thereof are typically preferred. Still another retinoic acid precursor for use is hydroxyanasatil retinoate made commercially available under the name Retextra® as supplied by Molecular Design International. The same may be used in a combination with any of the oil soluble benefit agents described herein.

When an optional (i.e., 0.0 to 1.5% by weight) oil soluble benefit agent is used in the cleansing bar, it typically is present in an amount of 0.001 to 1.5% by weight of the overall cleansing bar including all values and ranges subsumed therein, and for example, 0.05 to 1.2% by weight, for example, 0.2 to 0.5% by weight of the total weight of the cleansing bar composition.

Other useful skin benefit agents include the following:

(a) silicone oils and modifications thereof such as linear and cyclic polydimethylsiloxanes; amino, alkyl, alkylaryl, and aryl silicone oils;

(b) fats and oils including natural fats and oils such as jojoba, soybean, sunflower, rice bran, avocado, almond, olive, sesame, persic, castor, coconut, and mink oils; cacao fat; beef tallow and lard; hardened oils obtained by hydrogenating the aforementioned oils; and synthetic mono, di and triglycerides such as myristic acid glyceride and 2-ethylhexanoic acid glyceride;

(c) waxes such as carnauba, spermaceti, beeswax, lanolin, and derivatives thereof;

(d) hydrophobic and hydrophilic plant extracts;

(e) hydrocarbons such as liquid paraffin, petrolatum, microcrystalline wax, ceresin, squalene, pristan and mineral oil;

(f) higher fatty acids such as lauric, myristic, palmitic, stearic, behenic, oleic, linoleic, linolenic, lanolic, isostearic, arachidonic and poly unsaturated fatty acids (PUFA);

(g) higher alcohols such as lauryl, cetyl, stearyl, oleyl, behenyl, cholesterol and 2-hexydecanol alcohol;

(h) esters such as cetyl octanoate, myristyl lactate, cetyl lactate, isopropyl myristate, myristyl myristate, isopropyl palmitate, isopropyl adipate, butyl stearate, decyl oleate, cholesterol isostearate, glycerol monostearate, glycerol monolaurate, glycerol distearate, glycerol tristearate, alkyl lactate, alkyl citrate and alkyl tartrate;

(i) essential oils and extracts thereof such as mentha, jasmine, camphor, white cedar, bitter orange peel, ryu, turpentine, cinnamon, bergamot, citrus unshiu, calamus, pine, lavender, bay, clove, hiba, *eucalyptus*, lemon, starflower, thyme, peppermint, rose, sage, sesame, ginger, basil, juniper, lemon grass, rosemary, rosewood, avocado, grape, grapeseed, myrrh, cucumber, watercress, calendula, elder flower, geranium, linden blossom, amaranth, seaweed, ginko, *ginseng*, carrot, guarana, tea tree, jojoba, comfrey, oatmeal, cocoa, neroli, vanilla, green tea, penny royal, aloe vera, menthol, cineole, eugenol, citral, citronelle, borneol, linalool, geraniol, evening primrose, camphor, thymol, spirantol, penene, limonene and terpenoid oils;

(j) polyhydric alcohols, for example, glycerine, sorbitol, propylene glycol, and the like; and polyols such as the polyethylene glycols, examples of which are: Polyox WSR-205 PEG 14M, Polyox WSR-N-60K PEG 45M, or Polyox WSR-N-750, and PEG 7M;

(k) lipids such as cholesterol, ceramides, sucrose esters and pseudo-ceramides as described in European Patent Specification No. 556,957;

(l) vitamins, minerals, and skin nutrients such as milk, vitamins A, E, and K; vitamin alkyl esters, including vitamin C alkyl esters; magnesium, calcium, copper, zinc and other metallic components;

(m) sunscreens such as octyl methoxyl cinnamate (Parsol MCX) and butyl methoxy benzoylmethane (Parsol 1789);

(n) phospholipids; and (o) anti-aging compounds such as alpha-hydroxy acids and beta-hydroxy acids.

Preferred skin benefit agents include fatty acids, hydrocarbons, polyhydric alcohols, polyols, and mixtures thereof, with emollients that include at least one $C_{12}$ to $C_{18}$ fatty acid, petrolatum, glycerol, sorbitol, and/or propylene glycol being of particular interest in one or more embodiments. The agents may be added at an appropriate step during the process of making the cleansing bars. Some benefit agents may be introduced as macro domains.

Other optional ingredients like antioxidants, perfumes, polymers, chelating agents, colorants, deodorants, dyes, enzymes, foam boosters, germicides, anti-microbials, lathering agents, pearlescers, skin conditioners, stabilizers, or superfatting agents, may be added in suitable amounts in the process of making the bars. Preferably, the ingredients are added after the saponification step. Sodium metabisulphite, ethylene diamine tetra acetic acid (EDTA), borax, or ethylene hydroxy diphosphonic acid (EHDP) can be added to the formulation.

Additional optional ingredients which may be present in the cleansing bar compositions are, for example: fragrances; sequestering and chelating agents such as tetrasodium ethylenediaminetetraacetate (EDTA), ethane hydroxyl diphosphonate (EHDP), and etidronic acid, aka 1-hydroxyethylidene diphosphonic acid (HEDP); coloring agents; opacifiers, and pearlizers such as zinc stearate, magnesium stearate, $TiO_2$, ethylene glycol monostearate (EGMS), ethylene glycol distearate (EGDS) or Lytron 621 (Styrene/Acrylate copolymer), and the like; pH adjusters; antioxidants, for example, butylated hydroxytoluene (BHT) and the like; stabilizers; suds boosters, such as for example, coconut acyl mono- or diethanol amides; ionizing salts, such as, for example, sodium chloride and sodium sulfate, and other ingredients such as are conventionally used in cleansing bar compositions. The total amount of such additional optional ingredients is typically from 0 to 10% by weight, more particularly from 0.1 to 5% by weight, based on the total weight of the personal cleansing formulation.

The cleansing bars disclosed herein can be used to deliver antimicrobial benefits. Antimicrobial agents that can be included to deliver these benefits include oligodynamic metals or compounds thereof. Preferred metals are silver, copper, zinc, gold, aluminum, or a. Silver is particularly preferred. In the ionic form it may exist as a salt or any compound in any applicable oxidation state. Preferred silver compounds are silver oxide, silver nitrate, silver acetate, silver sulfate, silver benzoate, silver salicylate, silver carbonate, silver citrate, silver phosphate, or a combination thereof, with silver oxide, silver sulfate and silver citrate being of particular interest in one or more embodiments. In at least one aspect, the silver compound is silver oxide. Oligodynamic metal or a compound thereof can be included in an amount of 0.0001 to 2%, preferably 0.001 to 1% by weight of the cleansing bar composition. Alternately an essential oil antimicrobial active may be included in the cleansing bar composition. Essential oil actives which can be included are terpineol, thymol, carvacol, (E)-2 (prop-1-enyl) phenol, 2-propylphenol, 4-pentylphenol, 4-sec-butylphenol, 2-benzyl phenol, eugenol, or a combination thereof. Furthermore, preferred essential oil actives are terpineol, thymol, carvacrol, thymol, or a combination thereof, with the most preferred being terpineol or thymol, or a combination thereof. When present, essential oil actives can be included in an amount of 0.001 to 1%, preferably 0.01 to 0.5% by weight of the composition.

Even other ingredients which may be used include octopirox (piroctone), zinc pyrithione, chloroxylenol, triclosan, cetylpyridinium chloride, as well as silver compounds including silver oxide, nitrate, sulfate, phosphate, carbonate, acetate, benzoate, a combination thereof or the like. If used, these other components typically make up from 0.001 to 1.6% by weight of the overall cleansing bar including all values and ranges subsumed therein, and preferably, from 0.01 to 1.2% by weight.

Optionally, preservatives can be used in the cleansing bar disclosed herein. When used, illustrative preservatives for use include sodium benzoate, iodopropynyl butyl carbamate, phenoxyethanol, hydroxyacetophenone, ethylhexylglycerine, methyl paraben, propyl paraben, imidazolidinyl urea, sodium dehydroacetate, dimethyl-dimethyl (DMDM) hydantoin, and benzyl alcohol, or a combination thereof. Other preservatives suitable for use include sodium dehydroacetate, chlorophenesin, and decylene glycol. Preservatives are preferably employed in amounts of 0.01% to 2.0% by weight of the total weight of the cleansing bar, including all values and ranges subsumed therein. Also preferred is a preservative system with hydroxyacetophenone alone or in a mixture with other preservatives.

Fragrances, fixatives, opacifiers (like titanium dioxide or glycol distearate), and chelating agents may optionally be included in the cleansing bar. Possible chelating agents include, but are not limited to, ethylyene diaminetetraacetic acid (EDTA), diethylenetriaminepentaacetic acid (DTPA), ethylene diamine disuccinic acid (EDDS), pentasodium diethylenetriaminepentaacetate, trisodium N-(hydroxyethyl)-ethylenediaminetracetate, an acid form of EDTA, sodium thiocynate, trisodium salt of methylglycinediacetic acid, tetrasodium glutamate diacetate and phytic acid, preferably wherein the chelating agent is ethylene diaminetetraacetic acid (EDTA), diethylenetriaminepentaacetic acid (DTPA), ethylene diamine disuccinic acid (EDDS), or a combination thereof. Each of these substances may be present in an amount of about 0.03 to about 3% by weight of the overall cleansing bar including all values and ranges subsumed therein, preferably, about 0.1 to about 2.6% by weight.

The cleansing bar disclosed herein can have a hardness of 1 to 5 kilograms at 45° C., preferably, 2 to 3.75 kg at 45° C. measured by a TA.XT texture analyzer described herein in the protocol.

The cleansing bar disclosed herein has a moisture level of 10 to 20%, preferably 12 to 16% as measured by Karl Fischer titration.

Processes for preparing the cleansing bar disclosed herein are also contemplated. In a process for preparing the cleansing bar, zeolite powder can be added into a mixer containing water and free fatty acids (or partially neutralized fatty acid). The mixer can be heated to a temperature of about 75 to about 80° C. After heating, a polyol and non-soap surfactants can be added into the mixer and mixed for at least one to about five minutes. Citric acid and starch, if present in the formulation, can be added to the mixer and mixed for at least fifteen minutes at a temperature of at least 100° C. The final mixture can then be chill rolled into flakes and the flakes can be extruded, forming an extrudate. The extrudate can be stamped into the cleansing bar.

In another process for preparing a cleansing bar, free fatty acid can be added or neutralized partially in a mixer; and then a polyol and non-soap surfactants can be added into the mixer, forming a mixture. The mixture can be mixed for at least five minutes at a temperature of at least 100° C. Citric acid and starch, if present in the formulation, can be added into the mixer and mixed for about five minutes. Zeolite powder can then be added to the mixer. The final mixture can be chill rolled into flakes and flakes can be extruded to form an extrudate. The extrudate can then be stamped into the cleansing bar.

Such processes were unexpectedly found to create cleansing bars without grit, even those containing less than or equal to 50% by weight zeolite. Previously, such bars were extremely gritty, which is an undesirable feature for the consumer.

Except where otherwise explicitly indicated, all numbers in this description indicating amounts of material or conditions of reaction, physical properties of materials and/or use are to be understood as modified by the word "about." All amounts are by weight of the final composition, unless otherwise specified.

It should be noted that in specifying any range of concentration or amount, any particular upper concentration can be associated with any particular lower concentration or amount as well as any subranges consumed therein. In that regard, it is noted that all ranges disclosed herein are inclusive of the endpoints, and the endpoints are independently combinable with each other (e.g., ranges of "up to 25% by weight, or, more specifically, 5% by weight to 20% by weight, in inclusive of the endpoints and all intermediate values of the ranges of 5% by weight to 25% by weight, etc.). "Combination is inclusive of blends, mixtures, alloys, reaction products, and the like. Furthermore, the terms "first", "second", and the like herein do not denote any order, quantity, or importance, but rather are used to distinguish one element from another. The terms "a" and "an" and "the" herein do not denote a limitation of quantity and are to be construed to cover both the singular and the plural, unless otherwise indicated herein or clearly contradicted by context. The suffix "(s)" as used herein is intended to include both the singular and the plural of the term it modifies, thereby including one or more of the term (e.g., the film(s) includes one or more films). Reference throughout the specification to "one embodiment", "one aspect", "another embodiment", "another aspect", "an embodiment", "an aspect" and so forth means that a particular element (e.g., feature, structure, and/or characteristic) described in connection with the embodiment or aspect is included in at least one embodiment or aspect described herein and may or may not be present in other embodiments or aspects. In addition, it is to be understood that the described elements may be combined in any suitable manner in the various embodiments or aspects.

All cited patents, patent applications, and other references are incorporated herein by reference in their entirety. However, if a term in the present application contradicts or conflicts with a term in the incorporated reference, the term from the present application takes precedence over the conflicting term from the incorporated reference. While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

For the avoidance of doubt the word "comprising" is intended to mean "including" but not necessarily "consisting of" or "composed of." In other words, the listed steps, options, or alternatives need not be exhaustive.

The disclosure of the invention as found herein is to be considered to cover all aspects as found in the claims as being multiply dependent upon each other irrespective of the fact that claims may be found without multiple dependency or redundancy. Unless otherwise specified, numerical ranges expressed in the format "from x to y" are understood to include x and y. In specifying any range of values or amounts, any particular upper value or amount can be associated with any particular lower value or amount. All percentages and ratios contained herein are calculated by weight unless otherwise indicated. The various features of the present invention referred to in individual sections above apply, as appropriate, to other sections mutatis mutandis. Consequently, features specified in one section may be combined with features specified in other sections as appropriate. Any section headings are added for convenience only and are not intended to limit the disclosure in any way.

EXAMPLES

The following examples are merely illustrative of the cleansing bar compositions disclosed herein and are not intended to limit the scope hereof.

In the following examples, bars were prepared according to the following process, zeolite powder was added into a mixer containing water and free fatty acid (or partially neutralized fatty acid). The mixer was heated to a temperature of 75 to 80° C. After heating, synthetic surfactants were added to the mixer. The mixture was mixed for 5 minute(s). A polyol, citric acid, and starch (if used) were added to the mixer and mixed for 20 minutes at a temperature of at least 100° C. The final mixture was then chill rolled into flakes and the flakes were extruded, forming an extrudate. The extrudate was stamped into the cleansing bar.

The cleansing bars were tested for various properties including lather, grittiness, cracking, hardness, and pH, as described in the test protocol. The bar moisture was measured by Karl Fischer titration. Table 1 lists the cleansing bar compositions for Examples 1 to 3. All amounts are listed in % by weight of the cleansing bar composition. POLYOX™ refers to a water-soluble polyethylene glycol (PEG-45M) commercially available from Dow Chemical.

Bar Appraisal Protocol

Bar Hardness:

Bar hardness was measured with TA.XT Plus Texture Analyzer. In the measurement, the resistance force was recorded when a 30-degree conical probe penetrates into a bar at a speed of 10 mm/min. The hardness reading was taken as the force (Kg) at the target penetration distance of 15 mm. At least three measurements per sample were taken and averaged. The bar's size is much bigger than the penetration of the cone (15 mm). Right before the hardness measurement, the bars were equilibrated at 45° C. for at least 30 minutes. Therefore, in the present application, the hardness force was measured in Kg at 45° C.

Lather Test

Cleansing bars were evaluated by trained assessors under defined water hardness at constant temperature.

The test apparatus and conditions were as follows:

Controlled running water flow: 2.5 L/min or bowl

Ten-liter bowl with water at 30° C. (hardness of the local country)

Metronome set at 160/0 and stopwatch

Thermometer

Grittiness and Sandiness mock-ups-used to help the assessments on comparison of samples and definition of scores.

Assessments conducted by trained operators without gloves

The Procedure of Lather Assessment:

i. Pre-treatment: Before starting the assessment, the bar was wetted under running water, twisted 20 times between hands at 180° to remove the dried out surface layer. Then the bar was replaced on the tray.

ii. The bar was taken, dipped into a bowl and rotated out of the water 12 times at the pace of the metronome in 5 seconds counted on the chronometer.

iii. The bar was placed on the tray.

iv. The back of the left hand was swept with the right hand one single time to collect the lather that has been generated in both hands.

v. The hands were twisted three times.

vi. The lather amount was analyzed.

Attributes of lather quantity were measured according to the scale below.

| Lather Quantity (visual) |
|---|
| 1 Absent |
| 2 Too little |
| 3 Little |
| 4 Medium |
| 5 Reasonable a Lot |
| 6 Quite a Lot |

Lather quantity of "Reasonable a lot" and "quite a lot" are taken as good lathering properties.

Assessment of Grittiness

Bar feel during use including grittiness was evaluated according to defined qualitative scales by trained assessors.

Washdown of Mock-Ups:

i. Aligned the mock-ups on a flat base.

ii. Wetted the mock-ups and soap them with lots of foam, out of the water;

iii. Slid the mock-up on the palms of hands and passed the tips of fingers gently over its surfaces to quantify the level of grittiness and sandiness;

Pre-Treatment:

iv. In order have a better result, one must rotate the tablet 60 times under running water or in a bowl to remove the outer dried surface of the bar.

Assessment:

v. Rotated the tablet under water at 25° C. for approximately 1 minute and described the level of Grittiness on the samples according to the scale below. The use of mockups was recommended during the evaluation as reference.

vi. vi. Repeat the procedure v. under water at 40° C. (see Note 6 i.). In case of difficulty to describe the parameters, use the tip of the fingers over the bar surface.

| Grittiness |
|---|
| 1 No grit |
| 2 Traces of grit |
| 3 Slight amount of grit |
| 4 Moderate amount of grit |
| 5 High amount of grit |
| 6 Very high amount of grit |

Grittiness scale of "no grit" and "traces of grit" were acceptable and taken as smooth bars.

Cracking Assessment

Cracking can be defined as the assessment of the cracking build up on the bar from sequential washdown and drying of the bar.

The method was intended to simulate the use of a bar during normal consumer use. Bars were washed down at intervals, under controlled conditions, 6 times per day for 4 days. The bars were stored in controlled conditions after each washdown. Cracking assessment was made after 3 days of drying out under ambient conditions.

Apparatus required in washing down and cracking assessment:

Soap trays, with drainers.

Soap trays, without drainers.

Washing bowl of 10 liter capacity

Surgical gloves

Wash down procedure:

i. Started the test on first morning by putting bars on soap trays.

ii. Measured 10 ml of water (room temperature and appropriate hardness) and pour into the tray without drainers (25° and 40° C.).

iii. Carried out washdowns on each bar as following:

(a) Filled washing bowl with about 5 liters of water with appropriate hardness, and at the desired temperature (25° C. or 40° C.).

(b) Wearing surgical gloves, immersed the bar in the water, and twisted 15 times (180° each time) in the hands above water.

(c) Repeated (b).

(d) Immersed the bar in the water again in order to wash off the lather.

(e) Placed the bar back on its soap tray, ensuring that the top face is uppermost.

iv. Carried out the full washdown procedure 6 times per day for 4 consecutive days, at evenly spaced intervals during each day. Alternated the face placed down after each washdown. Between washdowns the soap trays should be left on an open bench or draining board, at controlled room conditions.

v. At the end of each day:

changed the position of each soap tray/bar on the bench, to minimize variability in drying conditions.

drained and refilled the soap tray without drainer (25° C. and 40° C.) with 10 mL water (ambient temperature). Consider the appropriate water hardness.

vi. After the last washdown on the 4th day, rinsed and dried all soap trays, and placed each bar on its soap tray.

vii. On the 5th day, turned the samples so they can dry both sides.

viii. On the 8th day, a trained assessor examined the bars and recorded the degree of cracking, according to the 0-5 scales below:

0—No cracking

1—Small and shallow cracking:

1.1—minimum degree 1.2—maximum degree

2—Small and medium deep cracking:

2.1—minimum degree 2.2—maximum degree

3—Medium and deep cracking:

3.1—minimum degree 3.2—maximum degree

4—Big and deep cracking:

4.1—minimum degree 4.2—maximum degree

5—Very big and very deep cracking:

5.1—minimum degree 5.2—maximum degree

Cracking is acceptable up to scale 3. In the bars disclosed herein, the bars had cracking scale of 0 to 2.

Assessment of Bar pH

The pH is read from an 8% by weight bar slurry prepared by the following procedure with a digital PH meter at 25° C.

Apparatus:

Beaker

Magnetic stir bar (3-4.75 cm diameter)

Magnetic mixer (IKA Werke RCT Basic)

Grater (2 mm pore size)

Plastic wrap

VWR bench top PH meter

Procedure:

1. Grated bar into chips.
2. Measured 92 g DI water into 150 ml beaker. Added stir bar and covered with plastic wrap to prevent evaporation.
3. Measured 8 g of soap chips. Added soap chips to stirring beakers (~200 RPM) and covered with plastic wrap to avoid evaporation.
4. Stirred for four hours. Stirring speed adjusted according to slurries' viscosities to maintain a slight vortex. It typically starts as thin suspension, then goes through a thick phase before eventually thinning out again.

Read the pH of prepared 8% by weight bar slurry with the bench top PH meter. The measurement is made at 25° C.

TABLE 1

| | Comparative Example A | Comparative Example B | Example 1 | Example 2 | Example 3 |
|---|---|---|---|---|---|
| Palmitic/Stearic Acid | 46.6% | 28.7% | 32.8% | 12.3% | 8.7% |
| Sodium Palmitate/Stearate | 25.2% | 14.5% | / | / | 0.8% |
| Sodium Cocoyl Isethionate | 10.0% | 9.9% | / | 8.3% | / |
| Sodium Lauroyl Isethionate | / | / | / | / | 4.2% |
| C16 methyl ester sulfonate | 10.0% | 9.9% | 9.7% | 10.0% | 11.0% |
| Cocamidopropyl betaine | 2.0% | 2.0% | 1.0% | 2.0% | 1.0% |
| Sodium Dodecyl Sulfate | / | / | 9.7% | / | 4.0% |
| Zeolite 4A | / | 3.0% | 14.5% | 42.0% | 43.0% |
| Starch | / | 14.9% | 14.5% | / | / |
| POLYOX ™ WSR N60K | / | / | 0.1% | 0.03% | 0.03% |
| Titanium dioxide ($TiO_2$) | 0.2% | 0.2% | / | 0.4% | 0.01% |
| Colorant | / | / | / | 0.1% | 0.2% |
| Fragrance | 1.0% | 1.0% | 0.9% | 1.0% | 1.0% |
| Citric Acid | / | / | 4.8% | 8.0% | 9.0% |
| $H_2O$ | 5.0% | 15.9% | 12.1% | 16.0% | 16.0% |
| Hardness (Kg, 45° C.) | 1.8 | 0.7 | 3.7 | 3.0 | 3.0 |
| Moisture | 5.2% | 17.2% | 12.1% | 16.0% | 16.2% |
| pH | 7.2 | 7.6 | 7.4 | 7.9 | 8.2 |
| Lather quantity (Visual) | Quite a lot | Reasonable a lot | / | Reasonable a lot | Reasonable a lot |
| Grittiness 25° C. | Slight amount of grit | Traces of grit | No grit | Traces of grit | Traces of grit |
| Grittiness 40° C. | Slight amount of grit | Traces of grit | No grit | Traces of grit | Traces of grit |
| Cracking 25° C. drained | 1 | 1 | 2 | 1 | 1 |
| Cracking 40° C. drained | 1 | 1 | 2 | 0 | 0 |

The hardness values for each of Examples 1 to 3 was greater than or equal to 3.0 Kg. A hardness value of greater than or equal to 3.0 indicates that the bars are of sufficient hardness so as to be processed on a high throughput line. As can be seen from Comparative Examples A and B, when zeolite was at 3.0% by weight or 0% by weight, such bars do not have sufficient hardness to be processed on a high throughput line. Without wishing to be bound by theory, it is believed that the zeolite structures water, making the bar mortar stiffer, which in turn increases bar hardness at higher water levels. Also demonstrated by Examples 1 to 3 is a higher moisture content as compared to Comparative Examples A and B, without the presence of or with less than 3% zeolite. It was further noted that the inclusion of zeolite did not adversely affect the pH of the cleansing bar, as the pH values were seen to be 7.4 to 8.2.

TABLE 2

Cleansing bar formulation with different processing as shown in Table 3.

| | Comparative Example C | Example 4 |
|---|---|---|
| Palmitic/Stearic Acid | 37.3% | 30.5% |
| Sodium Palmitate/Stearate | 20.1% | 16.0% |
| Sodium Cocoyl Isethionate | 10.0% | 10.0% |
| C16 methyl ester sulfonate | 10.0% | 10.0% |
| Cocamidopropyl betaine | 2.0% | 2.0% |
| Zeolite 4A | 9.0% | 17.0% |
| $TiO_2$ | 0.2% | 0.2% |
| Fragrance | 1.0% | 1.0% |
| $H_2O$ | 10.4% | 13.2% |

TABLE 3

Examples of processing conditions leading to either smooth or gritty bars

| | Comparative Example C - Processing 1 | Comparative Example C & Example 4 - Processing 2 |
|---|---|---|
| Processing | i. Dispersed zeolite in $H_2O$ at room temperature to form a first mixture. ii. Fatty acids melted in a mixer at 90° C., forming a second mixture. iii. Added by alternating the first mixture and the caustic (to neutralize partially the fatty acid) into the mixer containing molten fatty acids. iv. Nnon-soap surfactants added into the mixer. The mixture mixed for at least 15 minutes at a temperature of at least 100° C. v. The final mixture chill rolled into flakes and flakes extruded to form an extrudate, then stamped into the cleansing bar. | i. Partially neutralized fatty acid (by caustic) and water heated in a mixer at 75~80° C. Zeolite powder was then added into to the mixer. ii. Non-soap synthetic surfactants added to the mixer and mixed for 5 minutes. iii. The mixture mixed for 15 minutes at a temperature of at least 100° C. iv. The final mixture chill rolled into flakes and flakesextruded to form an extrudate. The extrudate stamped into the cleansing bar. |
| Grittiness (25° C.) | Very high amount of grit | No grit |

It was found that non-gritty cleansing bars could be produced even with the inclusion of zeolite and higher water content. The smoothness of bars is sensitive to processing and the improper processing can lead to bars with severe grittiness as shown in Comparative Example C-Processing 1. In the bars disclosed herein, the processing procedures are disclosed to produce bars which are surprisingly smooth and retain good in-use properties.

Example 4 through Processing 2 provides smooth bars with good properties, which contains higher moisture at 14.2% due to higher zeolite content compared to Comparative Example C.

What is claimed is:

1. A cleansing bar, comprising:

5 to 50% by weight soap and free fatty acid, based on the total weight of the cleansing bar, comprising 30 to 50% by weight free fatty acid based on the total weight of the cleansing bar and 0 to 16% by weight soap based on the total weight of the cleansing bar;

wherein the weight ratio of free fatty acid: soap is greater than 1:1;

10 to 25% by weight non-soap synthetic surfactants, based on the total weight of the cleansing bar;

9 to 50% by weight zeolite, based on the total weight of the cleansing bar; at least one filler; at least one polyol; and 10 to 30% by weight water, based on the total weight of the cleansing bar;

wherein a pH of the cleansing bar measured from an 8% by weight bar slurry is 4.5 to 9.

2. The cleansing bar of claim 1, comprising 6 to 45% by weight soap and free fatty acid, wherein the weight ratio of free fatty acid: soap is greater than 4.3:1.

3. The cleansing bar of claim 1, wherein the soap and free fatty acid comprises C8 to C24 soap and free fatty acid.

4. The cleansing bar of claim 1, wherein the soap and free fatty acid comprises palmitic acid, stearic acid, or a combination thereof.

5. The cleansing bar of claim 1, comprising 9 to 45% by weight zeolite.

6. The cleansing bar of claim 1, comprising 10 to 20% by weight water.

7. The cleansing bar of claim 1, wherein the filler comprises glycerine, starch, magnesium silicate, sodium silicate, aluminium silicate, calcium carbonate, sugar, clay, and combinations thereof.

8. The cleansing bar of claim 1, comprising 10% to 20% by weight synthetic surfactant, wherein the synthetic surfactant comprises an anionic, nonionic, amphoteric, cationic surfactant, or a combination thereof.

9. The cleansing bar of claim 1, wherein the polyol comprises polyhydroxy compounds, sugars, modified carbohydrates, polymeric synthetic polyols, or a combination thereof, wherein the polyhydroxy compounds comprise glycerol, propylene glycol, or a combination thereof; wherein the sugars comprise sorbitol, mannitol, sucrose, glucose, or a combination thereof; wherein the modified carbohydrates comprise hydrolyzed starch, dextrin, maltodextrin, or a combination thereof; wherein the polymeric synthetic polyols comprise polyalkylene glycols, wherein the polyalkylene glycols comprise polyethylene glycol (PEG), polypropylene glycol (PPG), or a combination thereof.

10. The cleansing bar of claim 1, wherein the cleansing bar has a ph of 4.5 to 8.5, when measured from an 8% by weight bar slurry.

11. The cleansing bar of claim 1, wherein the cleansing bar has a hardness of 1 to 5 kilograms at 45° C.

12. A process to prepare the cleansing bar of claim 1, comprising:

adding zeolite powder into a mixer containing water and the free fatty acid or partially neutralized fatty acid and optionally soap;

heating the mixer to a temperature of 75 to 80° C.;

adding non-soap synthetic surfactants into the mixer and mixing for five minutes;

optionally adding a polyol, citric acid, and starch, to the mixer and mixing for at least fifteen minutes at a temperature of at least 100° C. forming a final mixture;

chill rolling the final mixture into flakes;

extruding the flakes, forming an extrudate; and stamping the extrudate into the cleansing bar.

13. A process to prepare the cleansing bar of claim 1, comprising:

adding free fatty acid or partially neutralized fatty acid and optionally soap in a mixer;

adding non-soap synthetic surfactants into the mixer;

mixing the mixture for at least five minutes at a temperature of at least 100° C.;

optionally adding a polyol, citric acid, and starch into the mixer and mixing for five minutes;

adding zeolite powder into the mixer;

chill rolling the mixture into flakes;

extruding the mixture, forming an extrudate; and stamping the extrudate into the cleansing bar.

14. The cleansing bar of claim 2, comprising 7 to 40% by weight soap and free fatty acid.

15. The cleansing bar of claim 3, wherein the soap and free fatty acid comprises C8 to C18 soap and free fatty acid.

16. The cleansing bar of claim 15, wherein the soap and free fatty acid comprises C16 to C18 soap and free fatty acid.

17. The cleansing bar of claim 6, comprising 12 to 18% by weight water.

18. The cleansing bar of claim 10, wherein the cleansing bar has a pH of 5 to 8.5, when measured from an 8% by weight bar slurry.

19. The cleansing bar of claim 11, wherein the cleansing bar has a hardness of 2 to 3.75 kilograms at 45° C.

20. The cleansing bar of claim 19, wherein the cleansing bar has a hardness of 3 kilograms at 45° C.

* * * * *